J. Palmiter,
Sawing Shingles.
N° 15,081. Patented June 10, 1856.

UNITED STATES PATENT OFFICE.

JASON PALMITER, OF JAMESTOWN, NEW YORK.

ROTARY SHINGLE-MACHINE.

Specification of Letters Patent No. 15,081, dated June 10, 1856.

*To all whom it may concern:*

Be it known that I, JASON PALMITER, of Jamestown, in the county of Chautauqua and State of New York, have invented a new and Improved Machine for Cutting Shingles; and I do hereby declare that the following is a full, clear, and exact description of the same, reference being had to the annexed drawings, making a part of this specification, in which—

Figure 1:
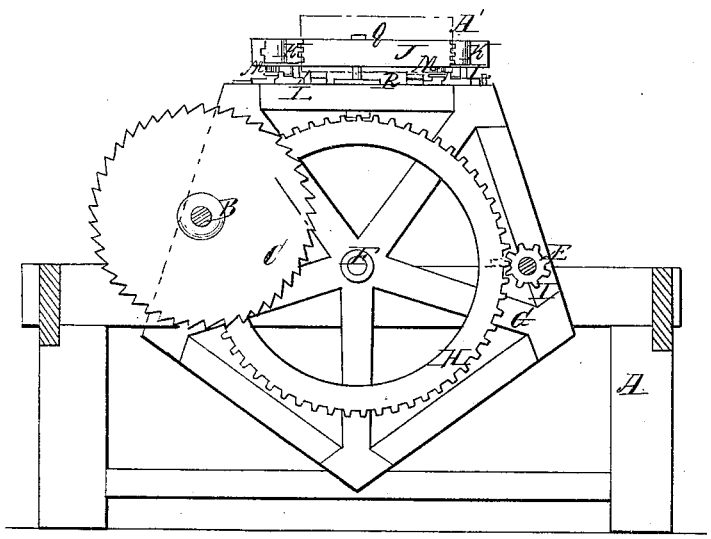
Figure 2:
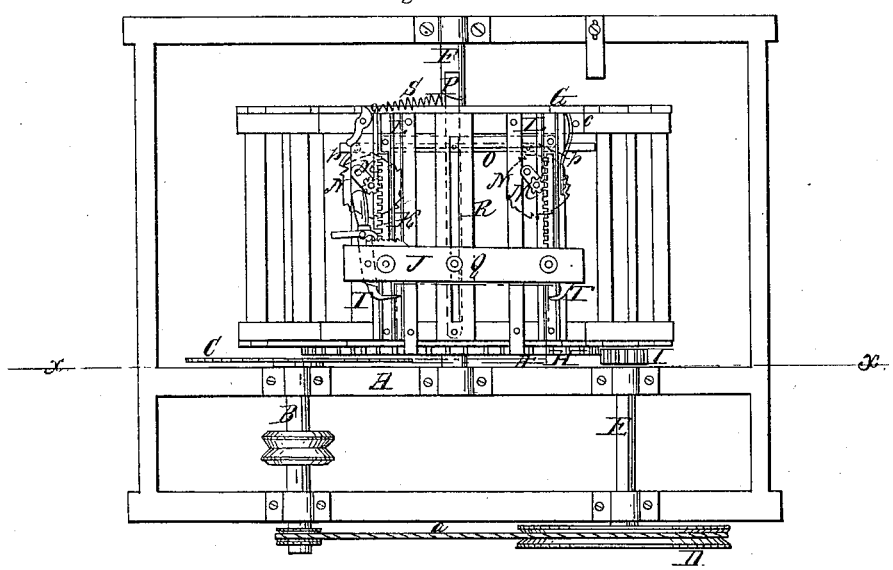

Figure 1, is a side view of the working parts of my improvement, the framing being bisected as indicated by the line (*x*), (*x*), Fig. 2. Fig. 2, is a plan or top view of the same.

Similar letters of reference indicate corresponding parts in the two figures.

My invention consists in attaching a series of carriages to the faces or sides of a polygonal wheel and having said carriages attached to racks in which pinions gear, the axes of the pinions having ratchets attached to them in which ratchets pawls on a sliding bar catch, the above parts being arranged and operating in connection with a circular saw as will be presently shown and described, so that the stuff or blocks from which the shingles are cut will, as the polygonal wheel rotates, be fed automatically to the saw.

To enable those skilled in the art to fully understand and construct my invention, I will proceed to describe it.

A, represents a rectangular frame, on which an arbor B, is placed; said arbor having a circular saw C, on its inner end. The saw C, is driven by a belt (*a*), from a driving pulley D, on a shaft E; said shaft being on the end of the frame A, opposite to the end where the arbor B, is placed.

F, is a shaft placed on the frame A, at about its center. This shaft has a polygonal wheel G, upon it. One side of the wheel G, has a geared rim H, attached to it, which rim meshes or gears into a pinion I, placed on the inner end of the shaft E. On the several faces of the wheel G, there are placed carriages J. Only one is represented in the drawings, that being sufficient as they are all similar to each other and arranged and operated precisely alike. The carriage J, is attached to racks K, K, a rack being at each end of the carriage. The racks K, K, are fitted in metal guides L, L, which are pivoted at one end to the faces or sides of the wheel G. M, M, are pinions which gear into the racks K, K. The axes of these pinions pass through the side or face of the wheel and have ratchets N, on their inner ends.

O, is a sliding bar placed on the under side of the face of the wheel and having two pawls (*b*), (*b*), attached to it said pawls catching into the ratchets N.

P, is a lever one end of which is pivoted to the under side of the face of the wheel. The bar O, is attached to this lever and the outer end of the lever P, projects some distance beyond the side of the wheel G.

Through the center of the carriage J, there passes a bolt Q. The inner end of this bolt works in a slotted plate R, attached to the face or side of the wheel. A spring S, is attached to one of the guides L, the end of said spring bearing against a pin C on the face or side of the wheel. This spring keeps the racks K, in gear with the pinions M, M. To the ends of the carriage J, dogs T, T, are attached. These dogs are of usual construction.

The operation is as follows. The blocks shown in red and designated by A', and from which the shingles are sawed are secured by the dogs T, to the several carriages on the wheel G. A rotating motion is given the driving pulleys D, in any proper manner and a rotary motion is communicated to the wheel G, and saw C. As the wheel G, rotates the saw C, cuts the shingles from the blocks and the lever P, of each side or face of the wheel as said sides approach the saw, is operated by a projection U, on the frame A, and the sliding bars O, are actuated and the pawls (*b*), (*b*), turn the ratchets N, and the pinions M, M, move the racks K, K, and the carriage J, and block toward the saw.

Thus it will be seen that the feed motion is automatic or self acting, each block being fed toward the saw a requisite distance at every revolution of the wheel.

Having thus described my invention what I claim as new and desire to secure by Letters Patent is,

Placing a series of carriages J, on the sides or faces of a polygonal wheel G, and giving said carriages the proper feed motion by means of the racks K, pinions M, ratchets N, and sliding bar O, with pawls (*b*), attached the above parts being arranged as shown and in connection with the circular saw C, substantially as described for the purpose specified.

JASON PALMITER.

Witnesses:
ORREL GREEN,
JOB DAVIS.